United States Patent [19]

Lemelson

[11] 4,217,037
[45] Aug. 12, 1980

[54] EYEGLASS SHIELDS

[76] Inventor: Jerome H. Lemelson, 85 Rector St., Metuchen, N.J. 08840

[21] Appl. No.: 928,299

[22] Filed: Jul. 26, 1978

[51] Int. Cl.² ............................................. G02C 7/10
[52] U.S. Cl. ......................................... 351/44; 351/47
[58] Field of Search ..................... 351/41, 61, 44–47, 351/48, 57–58; 2/13–15

[56] References Cited

U.S. PATENT DOCUMENTS

| 956,690 | 5/1910 | Donaldson | 351/61 |
|---|---|---|---|
| 2,668,952 | 2/1954 | Kobashikawa | 2/13 |
| 2,714,717 | 8/1955 | Allman | 2/13 |
| 2,949,609 | 8/1960 | Sager | 2/13 |
| 3,171,134 | 3/1965 | Kennedy | 2/13 |

FOREIGN PATENT DOCUMENTS 1052908  12/1966  United Kingdom ...................... 351/47

Primary Examiner—John K. Corbin
Assistant Examiner—B. W. de los Reyes

[57] ABSTRACT

An eye protection device adapted to be easily assembled and disassembled with a pair of eyeglasses to provide colored lenses for protecting the eyes of the wearer against sunlight and glare. The eye protecting device is specially constructed to permit it to be assembled with eyeglasses of the half-lens type wherein the wearer thereof may either look through the lenses of the eyeglasses or may look over the lenses. The colored lenses or shields of the eye protection unit are configured to cover not only the lenses of the eyeglasses but sufficient area thereabove so that, when the wearer looks over the eyeglass lenses to see objects at a distance, the eyes are protected from direct sunlight and glare. In one form, retaining means for the eye protecting unit extends inwardly from the right and left extremities thereof and is shaped to extend over and around the upper horizontal portion of the rim of the eyeglasses to hold the eye protection unit thereon. In another form, retaining means for the eye protection unit extends over and around the far extremities of the frame of the eyeglasses gripping or hanging on both the upper and side portions thereof.

9 Claims, 6 Drawing Figures

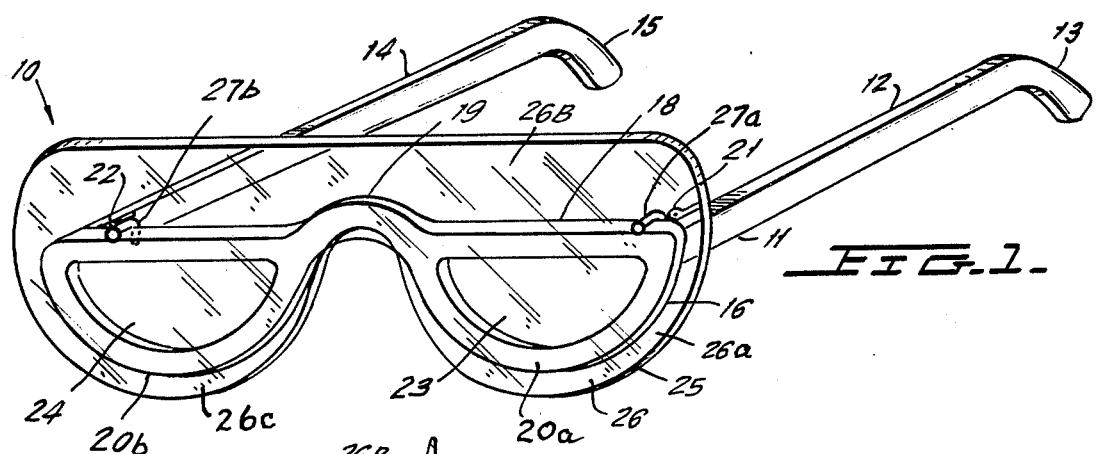
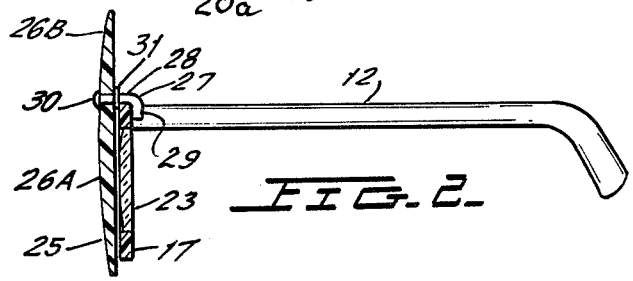
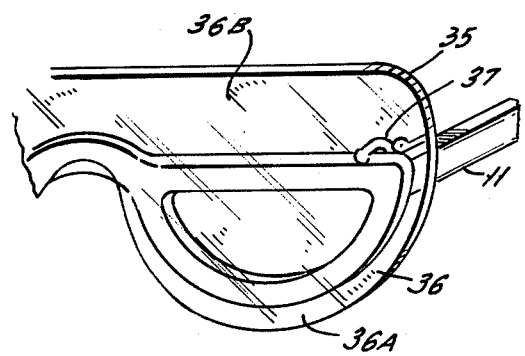
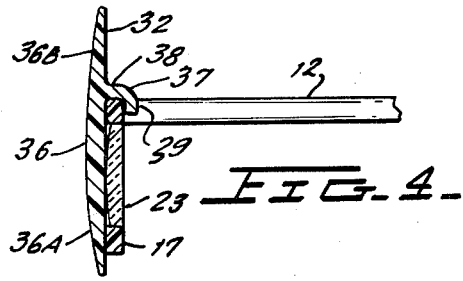
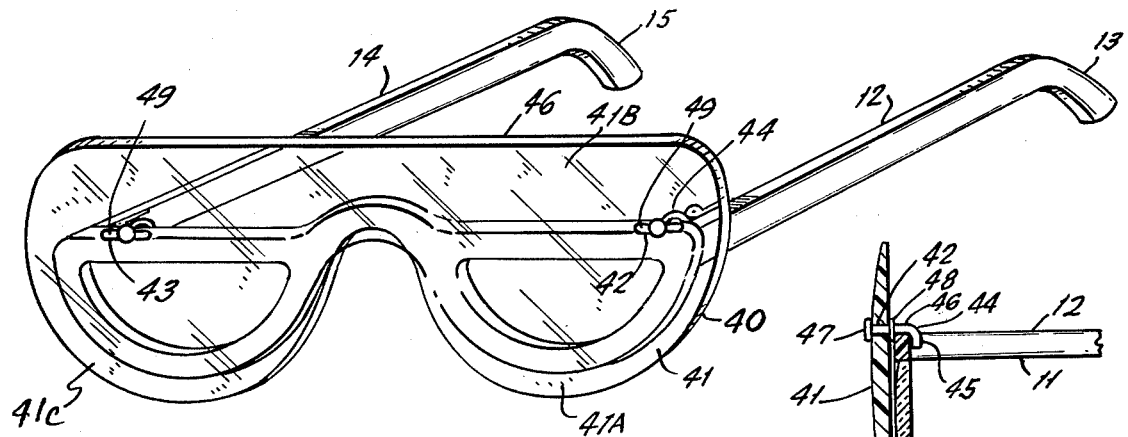

EYEGLASS SHIELDS

SUMMARY OF THE INVENTION

This invention relates to an eye protection device for use with eyeglasses of the half-lens type, which protection device is easily and quickly attached to and detached from such half-lens eyeglasses.

While it is known in the art to provide so-called snap-on eye shields or covers for conventional eyeglasses, there is no known eye shield for eyeglasses of the type which provide lenses for close viewing and reading, which lenses are of the so-called half-lens type and permit the eyes of the wearer of such eye-glasses to look over and beyond the top of the glasses for distance viewing. Conventional colored eye shields cannot properly assemble with eyeglasses of the half-lens type and if they were constructed to do so, they would fail to provide protection to the eyes of the wearer from intense light and glare when looking over the eyeglasses.

Accordingly, it is a primary object of this invention to provide a new and improved eye shield for use with eyeglasses of the half-lens type.

Another object is to provide an eye shield which is constructed to cover the lenses of a half-lens pair of eyeglasses and further constructed to permit the shield to protect the eyes of the wearer of such half-lens eyeglasses against glare and sunlight passing to the eyes from above the half-lens eyeglasses.

Another object is to provide eye protection means for half-lens eyeglasses containing portions extending both above and below the eyeglasses to permit the person wearing the glasses to be protected against glare and sunlight passing through the eyeglasses and such glare and sunlight which may pass to the eyes of the wearer when viewing at a distance.

Another object is to provide an eye shield assembly for half-lens eyeglasses which contains attachment means for attaching the shield to eyeglasses wherein such attachment means is laterally adjustable.

Another object is to provide an eye shield for eyeglasses containing attachment means to attach the shield to the eyeglasses wherein the attachment means is formed by molding during the same operation in which the shield is formed.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is an isometric view of an assembly of an eye shield and a half-lens pair of eyeglasses;

FIG. 2 is a side view with parts broken away for clarity of the assembly of FIG. 1;

FIG. 3 is a partial isometric view of an eye shield and a pair of half-lens eyeglasses wherein the eye shield is a modified form of the eye shield of FIG. 1;

FIG. 4 is a side view of FIG. 3 with parts broken away for clarity;

FIG. 5 is an isometric view of a modified form of the assemblies of FIGS. 1 and 3 and;

FIG. 6 is a partial side view of the assembly of FIG. 5 with parts broken away for clarity.

In FIGS. 1 and 2 is shown a first form of the invention defined by a glare or sun shield 25 defining an assembly 10 with a pair of so-called half-lens eyeglasses 11. Such half-lens eyeglasses are known in the art and are used by persons requiring near vision corrective lenses for reading, which lenses are subject to prevent normal viewing of distant objects. The eyeglasses 11 include side pieces 12 and 14 having respective curved or bent ends 13 and 15 which extend over and down around the ears of the wearer to retain the eyeglasses against the face and are connected at their other ends by hinges 21 and 22 to a frame 16 for a pair of half-lenses, denoted 23 and 24. The frame 16 includes a horizontal portion 18 extending laterally of the face at about the level of the arcuate nose retaining portion 19 of the frame and semi-circular portions 20a and 20b which hold the lower rims of the lenses 23 and 24. The visor of sun-shield 25 may be formed flat from a flat sheet of light transmitting but colored plastic or may be molded of such plastic. The visor 25 is composed of a lens or sheet-like shield portion 26 defined by lower right and left portions 26a and 26c and an upper portion 26b joining the lower portions together. The lower portions 26a and 26c respectively extend across and cover the left and right lenses 23 and 24 of the eyeglasses 11 while the upper portion 26b extends sufficiently above the upper portion 18 of the frame to protect the eyes of the wearer from the sun when the wearer is looking above the glasses 11 at distant objects and does not wish to view such distant objects through the lenses of the eyeglasses. The upper portion 26b also protects the eyes of the wearer of the eyeglasses 11 from glare directed from above while such person is looking through the lenses 23 and 24. Upper portion 26b thus extends, not only a sufficient distance above the frame 16 to protect the eyes of the wearer from the sun when viewing forwardly but also sufficiently laterally, as shown, to protect the eyes of the wearer when looking to either side. Thus the shield 25 extends an inch or two above the frame 16 and to or beyond the side extremities of the frame.

Removable attachment of the shield 25 to the eyeglasses 11 is effected in the embodiment of FIGS. 1 and 2 by means of an L-shaped fastener or fitting 27 having a main shank portion 28 and an end portion 29 at substantially right angles to the shank portion 28, which end portion 29 extends downwardly and is so disposed and configured to permit it to extend over and frictionally engage the upper horizontal portion 18 of the eyeglass frame 16. The main shank 28 is formed with an enlarged head 30 which, after the shank passes through a hole H in the shield 26, engages the outer or front face of the shield 25. A washer 31 secured to the shank 28 or an upset portion of the shank engages the rear face of the shield 16 firmly attaching the L-shaped fitting 27 to the shield. Two such fittings, denoted 27a and 27b are secured to opposite portions of the shield 25, as shown, to respectively secure the shield to opposite end portions of the horizontal portion 18 of the frame 16 for the half-lens eyeglasses.

In FIGS. 3 and 4 is shown a second embodiment of the invention wherein the fittings 27a and 27b of the embodiment of FIGS. 1 and 2 are replaced by respective portions of the molding which defines a shield 35 for the half eyeglasses 11. The shield 35 is shown having left and right lenses or cover portions, one of which 36A is shown in FIG. 3 and is joined to the other cover portion (not shown) by connecting portion 36B extending above the eyeglass frame as described.

Projecting rearwardly from the shield molding 35 and molded integral therewith at opposite ends of the shield and at the level of the upper portion of the eyeglass frame, are a plurality of L-shaped portions of the molding, one of which is denoted 37 and is shown as defined by a shank 38 which protrudes normal from the rear face of the shield 35 and contains an end-portion 39 at substantially right angles to shank 38. The length of the shank 38 is such as to permit the end portion 39 to extend over and frictionally engage the rear surface of the horizontal upper portion of the eyeglass frame, as described. Two such L-shaped protrusions respectively hold the shield 35 in assembly with the frame of the half eyeglasses 11.

In FIGS. 5 and 6, the eyeglasses 11 are shown assembled with an eye shield 40 having laterally adjustable means for securing such shield to half-lens eyeglasses of different widths or sizes. Eye shield 40 is formed with a lens portion 41, preferably by injection molding an extrudable light absorbant plastic, and contains left and right eye protecting portions 41A and 41C joined by an upper portion 41B, as described, which extends above the frame of the half-lens eyeglasses as described. Machined or molded integral with the eye shield 40 at the borders of the upper portion 41D and the lower portions 41A and 41C are respective elongated slot-like openings 42 and 43 through which respective L-shaped fittings 44 extend outwardly and downwardly as illustrated in FIG. 6. In each of the elongated openings 42 and 43 are disposed respective elastomeric springs or cushioning means denoted 49. The main shanks 48 of the L-shaped fittings 44 extend through or between elastomeric cushioning or spring means dispoed in the elongated openings 42 and 43 and serve to permit such fittings to be moved laterally with respect to the shield 41 so that they can be made to accommodate eyeglasses of different widths.

Modifications to the eye shield construction described include the following:

I. The fittings which retain the eye shield against the rim of the eyeglasses may be shaped and attached differently than the fittings which are illustrated in the drawings and described above. For example, such fittings may have a somewhat Z-shape with one leg thereof extending along a portion of the eye shield downwardly from an attachment point which is intermediate the upper and lower edges of the shield and a small rivet or screw may extend through an opening in the leg of the fitting and an opening in the shield to fasten the fitting thereto. The other leg of the Z-shaped fitting may extend over and around the upper rim of the eyeglasses to hold the shield in place thereon. Two or more of such fittings may be employed to retain the eye shield operatively against the eyeglasses as illustrated in the drawings.

II. Fittings or molded portions of the eye shield may also extend therefrom to attach the shield at three or more locations to the upper rim of the half-lens eyeglasses. Such fittings or molded portions may also extend inwardly from the eye shield over and around the downwardly extending side portions of the eyeglasses or rims for the half-lenses thereof.

III. A modified form of the invention may be employed with conventional eyeglasses to provide a portion of the eye shield above the upper rim of the eyeglasses to protect the eyes of the wearer from sun and glare which may pass to his eyes from above, particularly when the wearer of the eyeglasses has his head facing the sun and downwardly inclined.

IV. In the embodiments illustrated in the drawings, if the eye shield lens is injection molded of light transmitting plastic, increases in the thickness thereof may be provided at the attachment points for the fittings to enhance and improve fastening of the fittings thereto.

V. If the eye shield sheet or lens portion is injection molded of light transmitting plastic, the portions thereof to which the fittings are attached may be specially shaped to receive and either frictionally hold or permit the adhesive bonding of the fittings without the use of fasteners. Such special shaping may also be employed with fasteners so as to retain the fittings fixedly in place and prevent them from rotating or being forced out of operative alignment against the inside face of the eye shield. For example, if the fittings are Z-shaped, the leg of the fitting which extends along the eye shield may be inserted into and retained by a channel or groove which is molded in the rear face of the eye shield.

VI. Fittings or molded portions of the eye shield may also extend outwardly therefrom along the lower border portions of the shield and upwardly to permit engagement thereof behind the lower rims of the respective left and right lens retaining portions of the eyeglass frame to further improve fastening the eye shield to the eyeglasses.

I claim:

1. Eye protecting means for use with half-lens eyeglasses comprising in combination with a pair of half-lens eyeglasses having a frame with horizontally extending left and right frame portions defining the upper rim of said eyeglasses and terminating at about eye level of the wearer and having half-lenses secured within said frame and adapted to be worn by a person requiring corrective vision for reading purposes and shaped to permit such person to look over the top of said frame for viewing objects at a distance,
    an eye shield formed of colored light transmitting material, said eye shield being removably securable to said half-lens eyeglasses,
    said eye shield having:
    a lower portion covering the lenses of said eyeglasses and,
    an upper portion extending above the upper portion of said frame of said eyeglasses when said eye shield is operatively secured to said eyeglasses a sufficient degree to provide protection for the eyes of the wearer when viewing objects at a distance above said frame,
    temporary fastening means secured to said eye shield and protruding rearwardly therefrom intermediate said upper and lower portions of said eye shield for removably holding said eye shield on said horizontally extending upper portion of said frame in assembly with said eyeglasses.

2. Eye protecting means in accordance with claim 1 wherein said temporary fastening means comprises a pair of fittings secured to said eye shield and shaped to support said eye shield on the upper rim of the upper portion of said frame of said half-lens eyeglasses.

3. Eye protection means in accordance with claim 2 wherein said temporary fastening means comprise a pair of L-shaped retainers secured to said eye shield and having leg portions which extend outwardly and downwardly from the rear surface of said eye shield to be engaged over and around the upper rim of said eyeglasses.

4. Eye protection means in accordance with claim 3 wherein said L-shaped fastening means each have an end leg portion thereof and a lip portion adapted to extend over and around the upper rim of the eyeglasses.

5. Eye protection means in accordance with claim 4 wherein said eye shield has holes extending through respective left and right side portions thereof, the end leg of each fitting passing through a respective of said holes and attached to said eye shield.

6. Eye protection means in accordance with claim 5 wherein each of said fittings has a head portion at the end thereof and means secured to the shank of each of said fittings below the head portion thereof for clampingly engaging the fitting against opposite faces of the shield.

7. Eye protection means in accordance with claim 2 wherein each of said fittings is shaped and operable to frictionally engage the upper rim of the frame of the eyeglasses.

8. Eye protection means in accordance with claim 1 wherein said fastening means is molded integral with the material defining said eye shield.

9. Eye protection means in accordance with claim 8 wherein said temporary fastening means comprises molded protrusions extending from spaced-apart respective left and right portions of said eye shield and shaped to extend over and around the rim of said eyeglasses.

* * * * *